United States Patent
Aghababaie Beni et al.

(10) Patent No.: US 12,099,508 B2
(45) Date of Patent: Sep. 24, 2024

(54) PRODUCING NATIVELY COMPILED QUERY PLANS BY RECOMPILING EXISTING C CODE THROUGH PARTIAL EVALUATION

(71) Applicant: Oracle International Corporation, Redwood Shores, CA (US)

(72) Inventors: Laleh Aghababaie Beni, Pasadena, CA (US); Garret F. Swart, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/948,821

(22) Filed: Sep. 20, 2022

(65) Prior Publication Data
US 2024/0095249 A1  Mar. 21, 2024

(51) Int. Cl.
G06F 16/00    (2019.01)
G06F 8/41     (2018.01)
G06F 16/2453  (2019.01)
G06F 16/2455  (2019.01)

(52) U.S. Cl.
CPC .......... *G06F 16/24562* (2019.01); *G06F 8/41* (2013.01); *G06F 16/24542* (2019.01)

(58) Field of Classification Search
None
See application file for complete search history.

(56) References Cited

U.S. PATENT DOCUMENTS

| | | | | |
|---|---|---|---|---|
| 7,433,863 B2 * | 10/2008 | Zane | ............... | G06F 16/24549 |
| | | | | 707/999.005 |
| 8,145,655 B2 * | 3/2012 | Bireley | ............... | G06F 8/447 |
| | | | | 707/758 |
| 8,793,240 B2 * | 7/2014 | Potapov | ........... | G06F 16/24526 |
| | | | | 707/769 |

(Continued)

FOREIGN PATENT DOCUMENTS

KR    20180104498 A    9/2018

OTHER PUBLICATIONS

Neumann et al., "Compiling Database Queries into Machine Code", IEEE Computer Society Technical Committee on Data Engineering Bulletin, dated 2014, 9 pages.

(Continued)

*Primary Examiner* — Debbie M Le
(74) *Attorney, Agent, or Firm* — Hickman Becker Bingham Ledesma LLP; Brian Miller

(57) ABSTRACT

In an embodiment, a database management system (DBMS) hosted by a computer receives a request to execute a database statement and responsively generates an interpretable execution plan that represents the database statement. The DBMS decides whether execution of the database statement will or will not entail interpreting the interpretable execution plan and, if not, the interpretable execution plan is compiled into object code based on partial evaluation. In that case, the database statement is executed by executing the object code of the compiled plan, which provides acceleration. In an embodiment, partial evaluation and Turing- (Continued)

complete template metaprogramming (TMP) are based on using the interpretable execution plan as a compile-time constant that is an argument for a parameter of an evaluation template.

24 Claims, 9 Drawing Sheets

(56) References Cited

U.S. PATENT DOCUMENTS

| | | | |
|---|---|---|---|
| 9,195,712 | B2 | 11/2015 | Freedman et al. |
| 9,773,041 | B2 * | 9/2017 | Cruanes .............. G06F 16/2454 |
| 10,275,489 | B1 | 4/2019 | Muniswamy Reddy et al. |
| 10,489,170 | B2 * | 11/2019 | Toal ..................... G06F 9/45504 |
| 10,956,422 | B2 * | 3/2021 | de Castro Alves .......................... G06F 16/24568 |
| 11,132,366 | B2 * | 9/2021 | Mayr .................. G06F 16/9024 |
| 11,200,234 | B2 * | 12/2021 | Fender .................. G06F 16/212 |
| 11,301,468 | B2 * | 4/2022 | Bellamkonda .... G06F 16/24542 |
| 11,341,130 | B2 * | 5/2022 | Mathur ................. G06F 16/242 |
| 2013/0054649 | A1 | 2/2013 | Potapov et al. |
| 2016/0239582 | A1 | 8/2016 | Schechter et al. |
| 2017/0161325 | A1 | 6/2017 | Rastogi et al. |
| 2021/0064619 | A1 | 3/2021 | Fender et al. |
| 2021/0073226 | A1 | 3/2021 | Chavan et al. |
| 2022/0391392 | A1 | 12/2022 | Fender et al. |
| 2023/0359627 | A1 * | 11/2023 | Pandis ................ G06F 16/2443 |

OTHER PUBLICATIONS

Funke et al., "Low-Latency Compilation of SQL Queries to Machine Code", in Proceedings of the VLDB Endowment, vol. 14, Iss. 12, dated Jul. 2021, 4 pages.

Kersten et al., "Everything You Always Wanted to Know About Compiled and Vectorized Queries but Were Afraid to Ask", in Proceedings of the VLDB Endowment, vol. 11, Iss. 13, dated Sep. 2018, 14 pages.

Kersten et al., "Tidy Tuples and Flying Start: Fast Compilation and Fast Execution of Relational Queries in Umbra", in Proceedings of the VLDB Endowment, vol. 30, dated Jun. 2021, 23 pages.

Krikellas et al., "Generating Code for Holistic Query Evaluation", IEEE 26th International Conference on Data Engineering, dated Apr. 2010, 13 pages.

Lee et al., "Aggressive Function Splitting for Partial Inlining", 15th Annual Workshop on Interaction between Compilers and Computer Architectures, IEEE, dated Jun. 2011, 8 pages.

Cole et al., "Dynamic Compilation of C++ Template Code", Journal of Scientific Programming, vol. 11, No. 4, dated Dec. 2003, 8 pages.

Moerkotte, Guido, "Building Query Compilers", dated Mar. 5, 2019, Chapter 2 and sections 4.6-4.8, 4.12, and 7.3, 714 pages.

Yu et al., "Query Compilation in PostgreSQL by Specialization of the DBMS Source Code", Programming and Computer Software Consultants Bureau, vol. 43, No. 6, dated Dec. 16, 2017, pp. 353-365.

Neumann et al., "Efficiently Compiling Efficient Query Plans for Modern Hardware", in Proceedings of the VLDB Endowment, vol. 4, Iss. 9, dated Jun. 2011, 12 pages.

Pfander et al., "AutoTuneTMP: Auto-Tuning in C++ With Runtime Template Metaprogramming", IEEE International Parallel and Distributed Processing Symposium Workshops, dated Aug. 2018, 29 pages.

Shaikhha et al., "How to Architect a Query Compiler", in Proceedings of the 16th International Conference on Management of Data, dated Jun. 2016, 16 pages.

VoltDB.com, "Using VoltDB", https://docs.voltdb.com/UsingVoltDB/designappprocinstall.php, retrieved Sep. 19, 2022, 5 pages.

Wanderman-Milne, Skye, "Building a Modern Database Using LLVM", dated Nov. 6, 2013, 27 pages.

Würthinger et al., "Practical Partial Evaluation for High-Performance Dynamic Language Runtimes", in Proceedings of the 38th ACM SIGPLAN Conference on Programming Language Design and Implementation, dated Jun. 2017, 15 pages.

Marr, Stefan, "Tracing vs. Partial Evaluation", OOPSLA '15 Oct. 25-30, 2015, Pittsburgh, PA, USA, 20 pages.

Kashuba, Aleksei, et al., "Automatic Generation of a Hybrid Query Execution Engine", https://doi.org/10.48550/arXiv.1808.05448, Aug. 16, 2018, 6pgs.

Shaikhha et al., "Building Efficient Query Engines in a High-Level Language", ACM Transations On Database Systems downloaded https://doi.org/10.1145/3183653 (2018).

Pantilimonov et al., "Machine Code Cashing in PostgreSQL", Query JIT-Compiler downloaded https://doi.org/10.1109/IVMEM.2019.00009 (2019).

Menon et al., "Permutable Compiled Queries: Dynamically Adapting compiled queries without Recompiling", Proc> VLDB Endow pp. 101-113 (Nov. 2020).

Krikellas et al., "Generating code for holistic query evaluation" pp. 613-624 downloaded https://doi.org/10.1109/ICDE (2010). Generating code for holistic query evaluation. 613-624. https://doi.org/10.1109/ICDE.2010. 5447892.

Kohn et al., "Adaptive Execution of compiled Queries", IEEE 34TH International Conference On Data Engineering (ICDE) pp. 197-208 downloaded https://doi.org/10.1109/ICDE.2018.00027 (2018).

Funke et al., "Efficient Generation of Machine Code for Query Compilers", In Proceedings of The 16th International Workshop On Data Management On New Hardware (2020).

"The SQL and Xquery compiler process", IBM Documentation downloaded . https://www.IBM.com/docs/en/ db2/11.5?topic=optimization-sql-xquery-compiler-process (Sep. 27, 2022). (Feb. 2, 2024).

\* cited by examiner

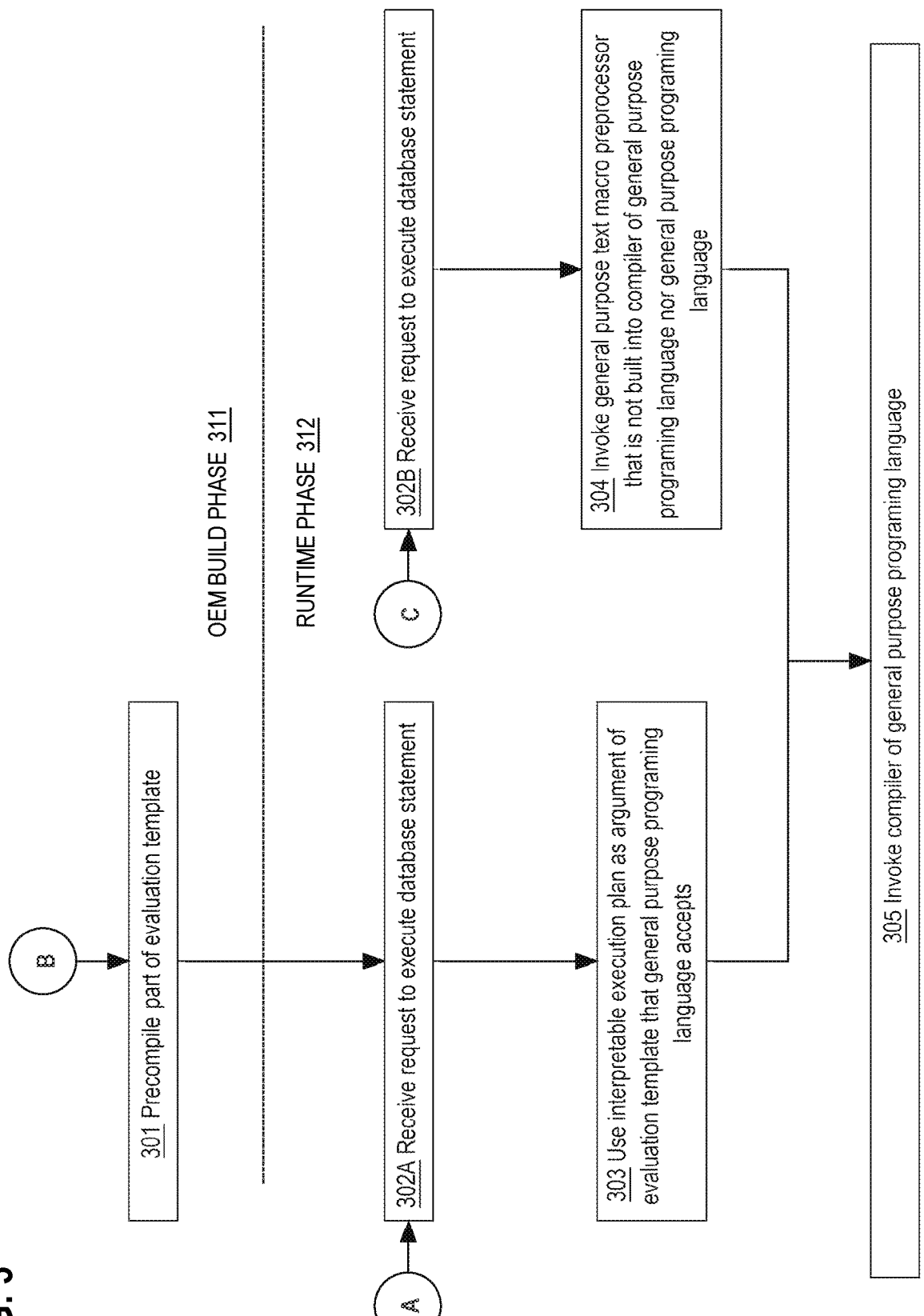

```
struct const_input{
  int a;
  int b;
  constexpr const_input(int a_, int b_) : a{a_}, b{b_}{};
}                                                              (4A)

struct pc_input{
  const const_input* c;
  int d;
  pc_input(const const_input* c_, int d_):c{c_}, d{d_}{};
}                                                              (4B)

template <const_input* in1>
int compute_pe(pc_input* in2){
  assert(*in1 == *in2->c);
  pc_input in{in1,in2->d};
  return compute(&in);
}                                                              (4C)

INLINE int compute(pc_input* val){
  int temp= val->c.a * 5 - 2;
  for (int i = 0; i < val->c.b; i++)
    temp *= val->d;
  return temp;
}                                                              (4D)
```

420 → pc_input can be a partially constant data structure if the const_input is instantiated as a constexpr compute_pe<{2,3}>(val)

430
```
Return 8*val->val;
```

The constant data structure const_input passed through and results in loop unrolling and constant folding 440 — instantiation
```
int compute_pe_2_2(pc_input* val) {
  static constexpr const_input c_in{2,2};
  return compute_pe<&c_in>(val);
}
```

PRODUCING NATIVELY COMPILED QUERY PLANS BY RECOMPILING EXISTING C CODE THROUGH PARTIAL EVALUATION

FIELD OF THE INVENTION

The present invention relates to execution optimization of database queries. Herein are techniques for optimal execution that use partial evaluation and an evaluation template for compilation of an interpretable query plan.

BACKGROUND

Database managements systems (DBMSs) typically execute a query by performing query interpretation. Query interpretation evaluates a query to generate a query execution plan to execute the query. The query execution plan is represented as an evaluation tree in shared memory. Each node in the tree represents a row source returning a single row or a stream of rows. A parent row source reads the results of its child row sources and computes its own results which it returns to its parent. Each row source is implemented as a previously compiled query plan operator that reads a node descriptor and executes the indicated computation on itself and invokes its children's functions through a function pointer.

A DBMS may perform native compilation of a query. Native compilation of a query means a DBMS compiles a database statement to generate machine instructions that are directly executed on a central processing unit (CPU) to perform at least a portion of operations needed to execute the database statement. To execute a database statement, a DBMS may use a combination of native compilation and query interpretation.

Existing query native compilers cannot use query interpreter components such as database operators. For example, VoltDB lacks a query interpreter. Likewise, VoltDB has no access to runtime conditions and fluctuating statistics of a database and thus cannot perform various optimizations while compiling queries.

Even when a state of the art database system has both of a query compiler and a query interpreter, the compiler and interpreter have separate implementations of database operators and other execution plan components. Separate implementations in a same database system requires dual maintenance, which is expensive and error prone. At runtime the separate implementations may each expect computer resources such as processor time and scratch space.

BRIEF DESCRIPTION OF THE DRAWINGS

In the drawings:

FIG. 3 is a flow diagram that depicts example computer processes that a DBMS may perform to apply partial evaluation and/or the first Futamura projection;

FIG. 4 is a block diagram that depicts an example partial evaluation;

DETAILED DESCRIPTION

Figure 1:
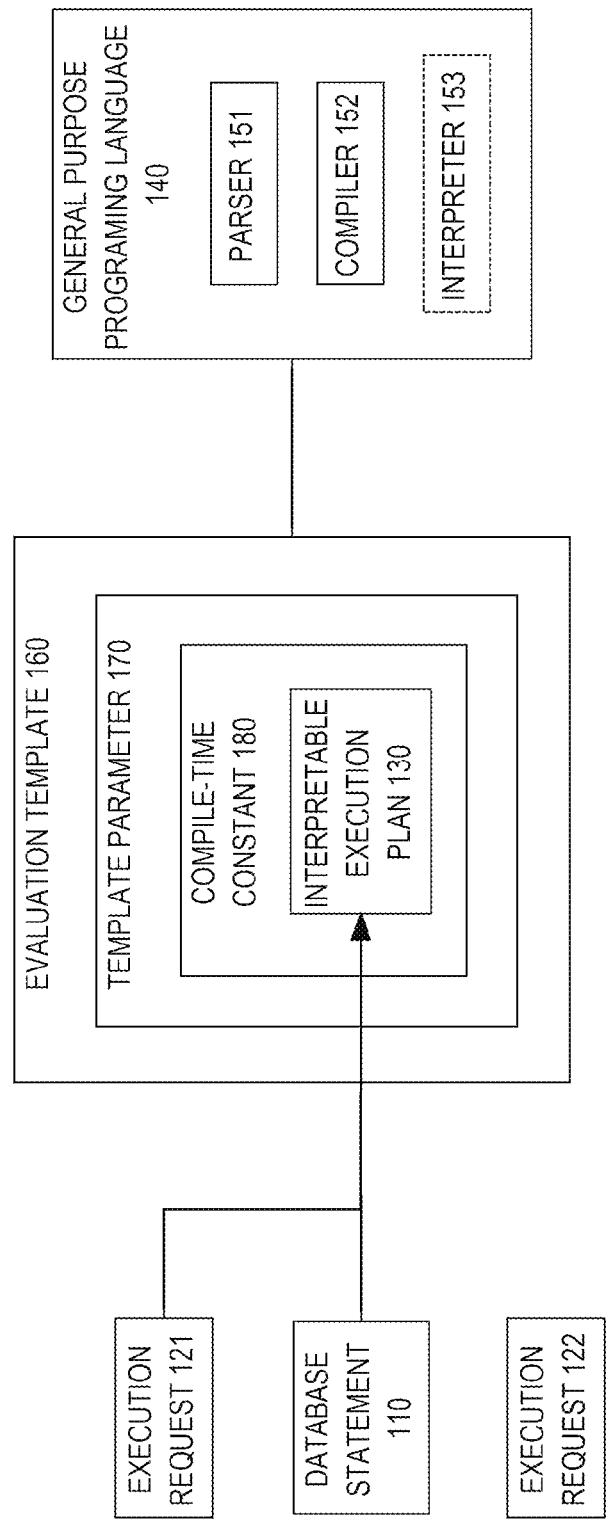
FIG. 1 is a block diagram that depicts an example database management system (DBMS) that optimally executes a database statement by using partial evaluation and an evaluation template for compilation of an interpretable execution plan.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Reducing database central processing unit (CPU) utilization has increasing importance as storage performance improves and the use of in-memory databases increases. Although online analytic processing (OLAP) can be accelerated using either native compilation or vectorization, for online transaction processing (OLTP) database statements, native compilation may be the most promising approach for CPU usage reduction. Native compilation of a new query is expensive, and techniques herein are adaptive based on frequency of query execution, unlike VoltDB that uses native compilation for every query. However, supporting separate native compilation-based and interpretation-based engines introduces maintenance and compatibility issues that techniques herein avoid.

Herein is a novel approach to generate plan specific compiled code from legacy C operators of a legacy query interpreter. In an embodiment, a plan compiler uses C++ version 20 template features for partial evaluation by treating the components of the SQL plan as constant values. This technique is discussed and referred to herein as the first Futamura projection. The SQL plan contains: a) encoded expressions from the SQL statement and b) needed schema information of the tables accessed such as column metadata, triggers, constraints, auditing, column encryption, label level security, and database indices to be used or maintained. All of this information is seamlessly constant-folded and optimized by the C++ compiler into the generated native compiled code that provides a fastest execution.

This approach is agnostic as to how specialized plans are generated and compiled. One example uses C++ version 20 template features by providing constant query plan data as non-type template parameters for template instantiations and then wrapping the template around existing interpreter code and adaptively inlining the existing interpreter's internal function calls. Another example instead uses a textual macro preprocessor to incorporate the SQL plan and its metadata into a compiled version that is generated from the interpreted version. Both examples eliminate the dual maintenance discussed in the Background.

This approach does not entail manually identifying parts of the query plan as immutable because the SQL compiler does this. Partial evaluation produces a natively compiled plan by recompiling the existing SQL row sources with the entire immutable portion of the plan provided as a compile time constant.

An example implementation uses the entire immutable plan for partial evaluation, which facilitates a more straightforward implementation. With adaptive compilation, commonly run SQL statements are partially evaluated with the entire immutable plan, while uncommon ones will not be partially evaluated at all. The cost of compilation may be high when an external compiler is used but can be lowered if a compiler is linked into the database codebase itself and the row sources to be recompiled are stored in a more efficient intermediate representation.

In an embodiment, a database management system (DBMS) hosted by a computer receives a request to execute a database statement and responsively generates an interpretable execution plan that represents the database statement. The DBMS decides whether execution of the database statement will or will not entail interpreting the interpretable execution plan and, if not, the interpretable execution plan is compiled into object code based on partial evaluation. In that case, the database statement is executed by executing the object code of the compiled plan, which provides acceleration. In an embodiment, partial evaluation and Turing-complete template metaprogramming (TMP) are based on using the interpretable execution plan as a compile-time constant that is an argument for a parameter of an evaluation template.

1.0 Example Computer

FIG. 1 is a block diagram that depicts an example database management system (DBMS) 100, in an embodiment. DBMS 100 optimally executes database statement 110 by using partial evaluation and evaluation template 160 for compilation of interpretable execution plan 130. DBMS 100 may be hosted by at least one computer such as a rack server such as a blade, a personal computer, a mainframe, a virtual computer, or other computing device.

DBMS 100 may contain and operate one or more databases such as a relational database that contains a relational schema, a database dictionary, and relational tables consisting of rows and columns stored in row major or columnar (i.e. column major) format in files that may consist of database blocks that each contain one or more records. Techniques for configuring and operating databases are presented later herein.

1.1 Database Statement

DBMS 100 receives execution requests 121-122 to execute same or different database statements such as database statement 110. Execution requests may be received from clients on remote computers over a communication network or by inter-process communication (IPC) from clients on a computer that hosts DBMS 100. Execution requests may be received for a database session on a network connection with a protocol such as open database connectivity (ODBC).

In various examples, either of requests 121-122 may contain a database statement or contain an identifier of a database statement that DBMS 100 already contains. Database statement 110 may contain relational algebra, such as according to a data manipulation language (DML) such as structured query language (SQL). For example, the DBMS may be a relational DBMS (RDBMS) that contains database(s) that contain relational tables. Instead, the DBMS may contain other datastore(s) such as a column store, a tuple store such as a resource description framework (RDF) triple store, a NoSQL database, or a Hadoop filesystem (HDFS) such as with Hadoop and/or Apache Hive.

Database statement 110 may be an ad hoc query or other DML statement, such as a prepared (i.e. batched) statement and/or a statement to create, read, update, or delete (CRUD). DBMS 100 receiving an execution request may cause DBMS 100 to parse database statement 110 to generate interpretable execution plan 130 that represents database statement 110 in a format that can be repeatedly interpreted to repeatedly execute database statement 110.

1.2 Execution Plan

Interpretable execution plan 130 contains operational nodes as tree nodes arranged as a tree data structure, such as created when a query parser parses database statement 110. In an embodiment, interpretable execution plan 130 is also an abstract syntax tree (AST) for a database language such as SQL.

Each node in interpretable execution plan 130 can be interpreted to execute a respective part of database statement 110, and interpretation of all nodes in interpretable execution plan 130 fulfils database statement 110. Database statement 110 may contain an expression that is a logical or arithmetic expression, such as a compound expression having many terms and operators. An expression may occur in a clause of database statement 110, such as for filtration by an SQL WHERE clause. A node in interpretable execution plan 130 may be specialized to perform a table scan, expression evaluation, grouping, sorting, filtration, joining, concatenation of columns, or projection.

Output data from one or a few nodes may be accepted as input by a node in a next level in the tree of interpretable execution plan 130. Dataflow generally proceeds from leaf nodes to intermediate nodes to the root of the tree whose output may be a set of multicolumn rows, a single column, or a scalar value that may answer database statement 110 and that DBMS 100 may return to a client on a same network connection that delivered the execution request from the client.

In an embodiment, interpretable execution plan 130 is a directed acyclic graph (DAG) instead of a tree. In that case, a DAG node may have fanout that transfers copies (by reference or by value) of output of the DAG node to multiple nodes. Whereas, a tree node may only provide output to one other node.

Interpretation of interpretable execution plan 130 is data driven such as according to the visitor design pattern in an embodiment, which may entail traversal of tree nodes. Post order traversal visits child nodes before visiting the parent node. A tree node is interpreted when it is visited, which may entail applying the logic of the node to input(s) of the node. Each input of a node may be provided by a respective other node and may be a set of multicolumn rows, a single column, or a scalar value. If an input is not scalar, then the input contains multiple values that the tree node may iterate over to process each value. For example, the logic of a node may contain a loop for iteration.

Nodes are reusable by parameterized instantiation and composable into lists and subtrees to form interpretable execution plan 130 as a composite. Herein and depending on the context, instantiation means either or both of: a) generation of an object as an instance of a class such as by invoking a constructor method and/or b) generation of a class by providing argument values to parameters of an evaluation template.

1.3 Relational Operator

Herein, a relational operator is a parameterized and reusable dataflow operator. Example parameters are not limited to an upstream operator that provides input to the current operator or a downstream operator that accepts output from the current operator.

Different kinds of relational operators may occur in interpretable execution plan 130. If interpretable execution plan 130 is a tree, then different kinds of relational operators may have fan-in by respectively accepting different kinds and counts of parameters as input but have only one output parameter to identify only one downstream operator. If interpretable execution plan 130 is a DAG, then a relational operator may have fanout with multiple outputs and/or with an output that identifies multiple downstream operators.

Herein and depending on the context, relational operator may mean either or both of: a) a reusable specification (e.g. class or template) in a generalized form that cannot be directly used or b) an instantiation of a relational operator that is specialized (e.g. by argument values for parameters) for a particular context. Herein, (b) may also be referred to as a node, a tree node, an operator node, or an operator instance. Interpretable execution plan 130 may be a tree or DAG that is composed of such nodes that are interconnected instances of relational operators. For example, one reusable relational operator may have multiple different instances in a same or different interpretable execution plans.

A consequence of reusable composability is that each node is more or less self-contained and depends as little as possible on the other nodes in interpretable execution plan 130. The logic of each node is separate to provide encapsulation and information hiding, such as with an invocable subroutine or an object class. That may preclude many important optimizations that apply to sets of logic implementations such as multiple subroutines as discussed later herein.

In an embodiment, a cost-base plan optimizer uses SQL database catalog information and database statement 110 to construct a computation tree that describes the best-executing (i.e. least computer resources, e.g. fastest) decomposition of database statement 110 into SQL operators that are relational operators, which function as row sources of retrieved or computed data tuples that flow up the tree from leaves to root. In other words, the query tree (or DAG) operates as a dataflow graph.

Each SQL operator is an object with a small set of virtual methods that are used to initialize (e.g. interconnect with other operators to form a tree or DAG) itself and to return row source results. Each operator instance contains constant data that the methods slowly interpret. Such constants may include any combination of:

The input shapes (i.e. row data structures, e.g. based on columns) to be expected from the child (i.e. upstream) row sources, tables, or indexes, encoded expressions that define the sequence of conditions to be evaluated on incoming rows, encoded expressions that define the sequence of results to be computed from incoming rows and provided to the parent (i.e. downstream) row source, and/or a set of database indexes that must be updated for which encoded expressions define the index keys.

DBMS 100 may apply optimizations that are dedicated to database acceleration such as rewriting database statement 110 and/or optimizing interpretable execution plan 130 such as during query planning. For example, a plan optimizer may generate multiple distinct and semantically equivalent plans and estimate their time and/or space costs to select a fastest plan. That is, interpretable execution plan 130 may be an optimal plan for database statement 110. However, interpretation of interpretable execution plan 130 is not necessarily an optimal execution of interpretable execution plan 130.

1.4 Plan Compilation

For a fastest possible execution and instead of interpretation, DBMS 100 may contain a plan compiler that compiles interpretable execution plan 130 to generate object code, which is a sequence of native machine instructions of an instruction set architecture (ISA) that is directly executable by a central processing unit (CPU). Like interpretation, compilation may entail tree traversal. When visiting a node, instead of interpreting the node, the plan compiler generates object code that implements the logic of the node.

In various embodiments, the plan compiler generates source code of general purpose programing language 140 that may be a high level language (HLL) and then uses compiler 152 to compile the HLL source code to generate object code. For example, the HLL may be C, C++, or Java. Compiling the HLL source code may entail any of: parsing by parser 151 to generate an AST, semantic analysis, generation of assembly language instructions, and/or optimized code generation of object code.

In various embodiments, the plan compiler does not generate HLL source code and instead directly generates any of those intermediate representations, such as an AST, assembler, or bytecode from which native object code may be generated. In an embodiment, the plan compiler instead directly generates native object code without any intermediate representation (IR). Any of the generated material, such as the HLL representation, the IR, and/or the object code, may be written to a volatile buffer or a persistent file. In an accelerated embodiment, no files are generated, and all generated material is volatile buffered until no longer needed.

Object code generated from the nodes of interpretable execution plan 130 may or may not be relocatable and may be statically or dynamically linked into the logic and address space of DBMS 100 for direct execution by DBMS 100 to execute database statement 110 without interpretation. Although execution of the object code of a compiled plan is semantically equivalent to interpretation of an uncompiled plan and their results are semantically equivalent, there may be semantically irrelevant differences between their results such as ordering of unsorted results.

By themselves, general purpose tools 140 and 151-153 are not expressly designed to execute database statements nor expressly designed to be embedded as shown in DBMS 100. For example, the plan compiler may use compiler 152 for code generation, but compiler 152 is not itself a plan compiler.

For example, DBMS 100 may have a SQL parser that generates query trees, which are not ASTs generated by parser 151. Interpreter 153 for general purpose programing language 140 is shown in dashed outline to indicate that it is: a) generally not used by techniques herein, b) is not a query interpreter and does not interpret interpretable execution plan 130, c) may be absent, and d) is demonstratively shown for contrast and disambiguation between a query interpreter and general purpose interpreter 153. For example, any query execution technique based on using interpreter 153 to interpret a Python script to execute database statement 110 is not the same as DBMS 100 interpreting interpretable execution plan 130 to execute database statement 110.

Unlike existing plan optimizers, the plan compiler can perform all of the code optimizations of an HLL source code compiler and of a backend code generator such as discussed later herein. Unlike existing plan optimizers, the plan compiler also can perform optimizations that require multiple relational operators (i.e. tree nodes) and that cannot be individually applied to one node as discussed later herein. Thus, acceleration herein may include three categories: avoidance of interpretation, best of breed optimization of machine code, and multi-operator optimization.

1.5 Applying Compile-Time Constant to Evaluation Template

In an embodiment, general purpose programing language 140 natively supports parameterized evaluation templates such as evaluation template 160 with parameter(s) such as template parameter 170 and that the plan compiler may generate for database statement 110. A predefined or newly generated (by a template generator contained in the plan compiler) evaluation template may be instantiated by the plan compiler by providing values as respective arguments for the parameters of evaluation template 160. An argument for a template parameter effectively is an invariant within an instantiation of evaluation template 160. Distinct instantiations of evaluation template 160 may have different argument values for a same template parameter 170.

A template parameter may be a constant value such as compile-time constant 180 or may be a datatype such as a primitive or an abstract data type (ADT) such as an object class. Compile-time constant 180 is not a datatype, an ADT, nor an object class, although compile-time constant 180 may be an instantiation of one of those. A datatype is not materialized (i.e. lacks actual data), whereas compile-time constant 180 specifies actual data.

In various embodiments, compile-time constant 180 may be a lexical constant such as a literal or other lexical text that parser 151 can accept, or compile-time constant 180 may be binary data that is not lexical. If compile-time constant 180 is lexical, then evaluation template 160 is expressed as source logic that parser 151 can accept. In either case, artifacts 160, 170, and 180 facilitate partial evaluation, which is a general purpose compilation technique that provides acceleration as discussed later herein.

In an embodiment, compiler 152 is a C++ version 20 compiler that contains parser 151, and template parameter 170 is a C++ non-type parameter. In that case, compile-time constant 180 may be a pointer or reference to an object that is an instance of a class. In an embodiment, interpretable execution plan 130 is an instance of a class, and compile-time constant 180 is a pointer or reference to that instance.

In an embodiment, compile-time constant 180 instead is a pointer or reference to the root node of a tree or DAG. In a non-C++ embodiment such as Java, compile-time constant 180 may be a literal specification of a lambda, a closure, or an anonymous class, which may be interpretable execution plan 130 or the root node of a tree or DAG. In various embodiments and as discussed later herein, compile-time constant 180 may contain (and interpretable execution plan 130 may contain) any combination of:
- multiple memory pointers,
- multiple noncontiguous memory allocations such as in a heap,
- a tree or a DAG,
- a compound expression that is based on database statement 110, and
- database schema information.

In various embodiments, compiler 152 generates a new class or ADT for each instantiation of evaluation template 160, a) unconditionally or b) only if the template instantiation has a distinct combination of argument values for all of the parameters of evaluation template 160. Herein depending on the context, code generation may entail any or all of: a) generation of evaluation template 160 by the template generator of the plan compiler, b) lexical (e.g. textual) generation, by the front end of compiler 152, of source logic for a template instantiation by the plan compiler, and/or c) generation, by the back end code generator of compiler 152, of natively executable binary machine instruction sequences for a template instantiation.

2.0 Example Partial Evaluation Process

Figure 2:
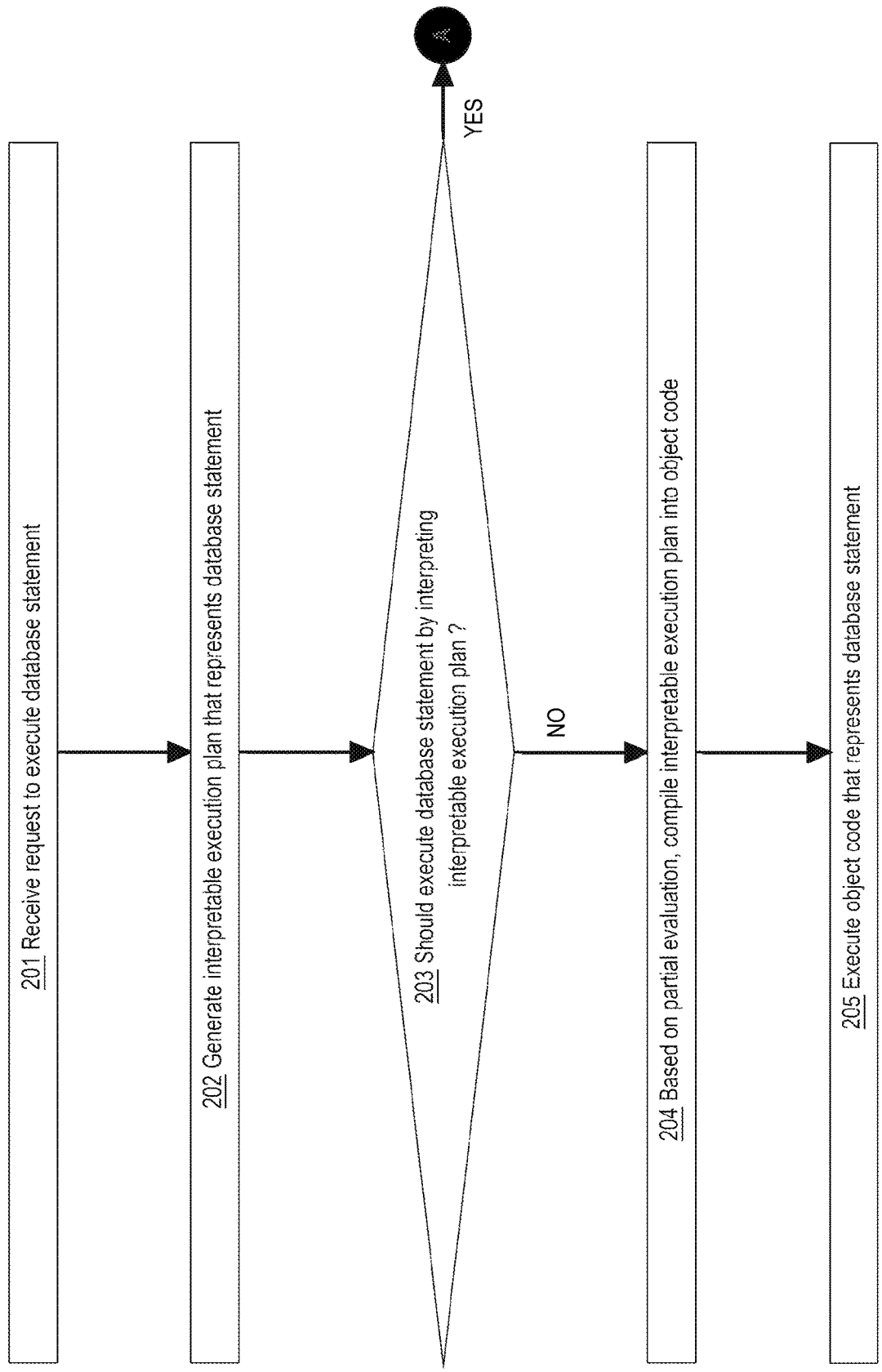
FIG. 2 is a flow diagram that depicts an example computer process that a DBMS may perform to optimally execute a database statement by using partial evaluation and an evaluation template for compilation of an interpretable execution plan.

FIG. 2 is a flow diagram that depicts an example computer process that DBMS 100 may perform to optimally execute database statement 110 by using partial evaluation and evaluation template 160 for compilation of interpretable execution plan 130, in an embodiment. FIG. 2 is discussed with reference to FIG. 1.

Step 201 receives execution request 121 to execute database statement 110 as discussed earlier herein.

From database statement 110, step 202 generates interpretable execution plan 130 that represents database statement 110 as discussed earlier herein.

According to execution criteria discussed later herein, step 203 decides whether or not database statement 110 should be executed by interpreting interpretable execution plan 130. If step 203 decides YES, then database statement 110 is executed by interpreting interpretable execution plan 130 as discussed earlier herein and the process of FIG. 2 ceases. Otherwise, step 204 occurs.

Step 204 invokes the plan compiler as discussed earlier herein. Based on partial evaluation, step 204 compiles interpretable execution plan 130 into object code. Partial evaluation and other code generation optimizations that step 204 may apply are as follows.

In an embodiment, compiler 152 is a C++version 20 compiler, and function templates of relational operators accept compile time data structures as constant expression (constexpr) parameters that facilitate partial evaluation of the function bodies of the virtual functions of the relational operators, such as a row source function. A natively compiled plan is produced by compiling a C++ file (e.g. stored only in volatile memory) that instantiates the C++ function template with a constant portion of the row source.

Step 204 avoids interpretation of interpretable execution plan 130. Plan interpretation is slow because execution of each expression (or operation or operator) is deferred until actually and immediately needed, even if the expression was previously executed such as in a previous iteration of a loop. Slowness of plan interpretation is due to three major overlapping inefficiencies.

The first inefficiency is repeated and redundant interpretation such as by iteration. For example, interpretable execution plan 130 may specify iteration over millions of rows of a relational table. Some of the decisions and operations may be unnecessarily repeated for each row/iteration. This problem may be aggravated by a so-called non-blocking (e.g. streaming) operator, which is a tree node that processes and/or provides only one row at a time because the node does not support bulk operation such as for a batch of rows or all rows in a table. For example, a looping operator may repeatedly invoke a non-blocking operator, once per iteration to obtain a next row. The non-blocking operator is stateless and is fully interpreted during each invocation/iteration.

The second inefficiency of plan interpretation is control flow branching. A typical operator/node may have dozens of control flow branches to accommodate a rich diversity of datatypes, schematic patterns and constraints, and transactional conditions. Branching can frustrate hardware optimizations such as an instruction pipeline, branch prediction, speculative execution, and instruction sequence caching.

The third inefficiency of plan interpretation is node encapsulation. Various important general purpose optimizations are based on violating encapsulation boundaries such as lexical block scope, information hiding, and boundaries of classes and subroutines. For example as explained later herein, fusion of multiple operators, logic inlining, and cross-boundary semantic analysis are unavailable with plan interpretation.

Partial evaluation based on compile-time constant 180 provides a way for step 204 to avoid those three major inefficiencies of plan interpretation. Partial evaluation entails executing some computational expressions that occur in interpretable execution plan 130 during plan compilation and before actually accessing database content such as table rows. Literals and other constants that are specified in interpretable execution plan 130 can be used to immediately resolve some expressions and conditions that occur in implementations of relational operators that are referenced/instantiated by interpretable execution plan 130.

For example, a filtration operator may contain one control flow path for comparing to a null value and another control flow path for comparing to a non-null value, and partial evaluation can select which control flow path during plan compilation by step 204 by detecting whether a WHERE clause of database statement 110 specifies a null or non-null filtration value. General purpose examples of conditions that partial evaluation can detect and eagerly resolve and optimize include null value handling, zero value handling, datatype polymorphism, down-casting, numeric demotion (i.e. as discussed later herein, a narrowing conversion that is the opposite of widening promotion) conversion, branch prediction and dead code elimination, virtual function linking, inlining, node fusion, strength reduction, loop invariant, induction variable, constant folding, loop unrolling, and arithmetic operation substitution.

Those various general purpose optimizations are complementary and, in many cases, synergistic such that applying one kind of optimization creates opportunities to use multiple other kinds of optimizations that might otherwise be unavailable. For example, inlining may overcome lexical visibility barriers of inlined internal identifiers and expressions. In turn, that may facilitate most of the other general purpose optimizations. In some embodiments, a few optimizations may always be unavailable unless inlining occurs, such as fusion.

Compiler 152 may automatically provide partial evaluation and those optimizations based on artifacts 130, 160, 170, and 180. Partial evaluation by step 204 entails transferring specified details of interpretable execution plan 130 into reusable interpretable node implementations. In other words, step 204 uses partial evaluation to resolve/embed interpretable execution plan 130 into the reusable interpretable node implementations, which is referred to herein as the first Futamura projection. The result of the first Futamura projection is generation of highly specialized logic that has lost the abilities of a generalized interpreter from which the logic is derived in exchange for streamlined processing of a particular input such as interpretable execution plan 130.

For example if partial evaluation detects that null value handling is not needed for interpretable execution plan 130, then null handling logic in one or more operators is removed/absent in the highly specialized logic that step 204 generates. Likewise, SQL is highly datatype polymorphic, but a typical relational database schema has little or no datatype polymorphism. Partial evaluation can eliminate most type-narrowing control flow branches because interpretable execution plan 130 as compile-time constant 180 expressly or, as discussed later herein, indirectly provides type specificity.

In various embodiments, compile-time constant 180 may contain (and interpretable execution plan 130 may contain) database schema information and statistics that includes any combination of:
a database dictionary,
an identifier of a database table,
a statistic of a database table,
column metadata,
an identifier of a database trigger,
a security label,
and an identifier of a database index.

In various embodiments, compile-time constant 180 may contain (and interpretable execution plan 130 may contain) column metadata that includes any combination of: a column identifier, a datatype, a column constraint, a column statistic, and encryption metadata.

In various embodiments, compile-time constant 180 may contain (and interpretable execution plan 130 may contain) a security label that is assigned to any of: a user, a table, or a table row.

In various embodiments, compile-time constant 180 may contain (and interpretable execution plan 130 may contain) any combination of metrics (e.g. for loop unrolling) of database statement 110 such as:
a count of table columns to read,
a count of table columns used for filtration, and
a count of (e.g. computed) columns to project.

Streamlined logic generated by step 204 can, in most cases, only be used to execute interpretable execution plan 130 for database statement 110, which that streamlined logic does faster than a plan interpreter could. The plan interpreter is slower because it must accommodate different plans for a same database statement and also accommodate different database statements and different database schemas.

The logic that step 204 generates may be so streamlined that the control flow paths that are present in the streamlined logic are only or almost only the few control flow paths that are actually needed by interpretable execution plan 130 for database statement 110. Thus the amount of branching that dynamically occurs during execution of the object code generated by step 204 may be order(s) of magnitude less than would be incurred by interpretation of interpretable execution plan 130.

Step 204 generates object code that is based on the instruction set and architecture of the CPU of DBMS 100, which may be an advanced CPU that was unconsidered or nonexistent during application development when database statement 110 was designed and shrink wrapped. In other words, step 204 provides future proof optimization for database statement 110 by intensively exploiting whatever general purpose accelerations are provided by hardware and the backend of compiler 152 when step 204 occurs.

For example, evaluation template 160 may be generated by a template generator of a plan compiler that was designed before the latest and best release version of the backend of compiler 152 existed. For example, the backend (e.g. object code generator) of compiler 152 may be repeatedly upgraded after the plan generator and/or template generator is installed.

Futamura projection may have several progressive degrees (i.e. numbered projections) along a spectrum of intensity ranging from, at one end of the spectrum, optimizing an interpreter, to recasting the optimized interpreter into a compiler or, at the other end of the spectrum, to optimizing the compiler. Futamura projection by step 204 includes reusing the plan interpreter as part of a plan compiler that generates highly optimized object code. Thus, step 204 performs what is referred to herein as the first Futamura projection, which actually achieves compilation and generates object code.

Previous plan compilers do not perform Futamura projection. The plan compiler of step 204 performs the first Futamura projection because the plan compiler uses (but not interprets) reusable interpretable node implementations and the interpretable execution plan 130. Previous plan compilers used an execution plan that was not interpretable, which is not Futamura projection.

Having an interpretable execution plan is a necessary but insufficient precondition of Futamura projection. For Futamura projection, the plan compiler must actually use the interpretable execution plan. A DBMS that can generate an interpretable plan for a plan interpreter and a separate uninterpretable plan for a plan compiler is not the same as a DBMS that can provide interpretable execution plan 130 to either or both of a plan interpreter and, for Futamura projection, to a plan compiler. In other words, interpretable execution plan 130 is dual purpose, which is novel. Novel efficiencies provided by that dual purpose are discussed later herein.

Step 204 generates object code that represents database statement 110, and step 205 directly executes the object code, which may entail static and/or dynamic linking of the object code into the address space of DBMS 100. The result of step 205 is semantically the same as the result that would have been provided if interpretable execution plan 130 were interpreted instead of processed by steps 204-205.

3.0 More Example Partial Evaluation Processes

FIG. 3 is a flow diagram that depicts example computer processes A-C, any of which an embodiment of DBMS 100 may implement and perform to apply partial evaluation and/or the first Futamura projection as discussed elsewhere herein. The steps of the processes of FIGS. 2-3 are complementary and may be combined or interleaved. FIG. 3 is discussed with reference to FIG. 1.

Processes A-C have separate starting points. Process B starts at step 301. Processes A and C respectively start at steps 30 A-B that may identically behave and share a same implementation. Processes A and C entirely occur during runtime phase 312 during normal operation of DBMS 100.

Process C is the most generalized because it expects the least functionality and integration of the general purpose tool chain associated with general purpose programing language 140 that includes tools 151-152. With process C, that tool chain need not have dedicated support for artifacts 160, 170, and 180. In an embodiment of process C, compiler 152 is a C compiler that does not support C++ or is a legacy C++ compiler that lacks the features of C++ version 20. In an embodiment of process C, general purpose programing language 140 does not have dedicated support for evaluation templates.

Steps 302B and 304 occur only in process C. Step 302 receives execution request 121 to execute database statement 110 as discussed earlier herein.

The following activities occur between steps 302B and 304. A query planner generates interpretable execution plan 130. Generally, interpretable execution plan 130 combines two software layers. In a reusable layer is source code that defines reusable/instantiable relational operators. In the reusable layer, the operators are uninstantiated and loose/disconnected, which means that they are not interconnected in any useful way.

The reusable layer may contain definitions of relational operators that are irrelevant to database statement 110 and that will not be instantiated in interpretable execution plan 130. The reusable layer is predefined during original equipment manufacturer (OEM) build phase 311 that DBMS 100 does not perform. OEM build phase 311 is performed by the independent software vendor (ISV) (e.g. Oracle corporation) that shrink wraps the codebase of DBMS 100. In other words, the reusable layer is contained in the shrink wrapped codebase of DBMS 100.

The reusable layer contains source code that defines reusable/instantiable relational operators. Although not part of the reusable layer and not used by a plan compiler, object code that was compiled from the source code of the instantiable operators may also be included in the shrink wrapped codebase of DBMS 100. The object code of the instantiable operators are components of the plan interpreter and execute only during plan interpretation, which processes A-C do not do.

The other layer is the plan layer that contains interpretable execution plan 130 that may or may not contain references to and instantiations of the relational operators from the reusable layer. Different embodiments of any of processes A-C may combine the plan layer and the reusable layer in various ways discussed herein.

For process C, both ways are based on text substitution in step 304 by invoking a general purpose text macro preprocessor that is not built into compiler 152 nor general purpose programing language 140. For example, the macro preprocessor may be M4 or the C preprocessor (CPP).

In source code, macro preprocessing replaces occurrences of a symbol with an expanded definition of the symbol. In other words, the symbol operates as a placeholder in the source code. The symbol being replaced may resemble an identifier and may be delimited by whitespace or other separators. The replacement definition of the symbol may be text composed of one or more symbols (i.e. tokens).

Preprocessing may be recursive because symbols within replacement text may themselves be subject to replacement. A macro is a replacement definition that has parameters that the original symbol may provide for embedding into the replacement text.

Generally the preprocessor of step 304 expects two bodies of text. One body of text contains an interleaved mix of text that should not be altered and symbols that should be replaced. The other text contains the replacement definitions to be copied into the first body of text. For example in C/C++, a header file contains replacement definitions, and a source file contains the body of text that will receive the replacements. To engage the preprocessor, the source file may reference the header file. A source file or a header file may reference multiple header files. A header file may be referenced by multiple source files and/or multiple header files.

Process C then performs step 305 that invokes compiler 152 to generate object code that represents interpretable execution plan 130 for database statement 110. That object code can be directly executed as discussed earlier herein. In an embodiment of process C, steps 304-305 are combined such as when a C/C++ compiler contains both of a preprocessor and an object code generator.

Instead of preprocessing, process A relies on evaluation template tooling that is native to general purpose programing language 140 such as with version 20 of C++. Step 302A occurs as discussed above for step 302B.

Step 303 performs Turing-complete template metaprogramming (TMP) by using interpretable execution plan 130 as compile-time constant 180 that is provided for template parameter 170 of evaluation template 160 that general purpose programing language 140 natively accepts. Turing-complete means that step 303 supports the full expressiveness of SQL and any interpretable execution plan 130 for any database statement 110. For example, evaluation template 160 may write to and/or declare a static variable to achieve stateful behavior.

In an embodiment, TMP is used for what is referred to herein as F-bound polymorphism, which accelerates execution by not needing virtual functions and a virtual function table, which are slow due to indirection based on function pointers. In an embodiment, F-bound polymorphism is used for polymorphism occurring in a composite structural design pattern such as a query tree or DAG whose node types (i.e. kinds of relational operators) are heterogenous based on polymorphism. F-bound polymorphism is faster than standard C++ polymorphism, which is based solely on classes without templates. F-bound polymorphism is instead based on templatized classes.

Step 303 may use a similar software layering, as discussed above for step 304, between a reusable layer that contains source code that defines instantiable operators and a plan layer that contains interpretable execution plan 130 that may or may not contain references to and instantiations of the relational operators from the reusable layer.

As discussed above for step 304, preprocessor text substitution may be recursive, in which case a replacement definition may contain placeholders that may be replaced by other replacement definitions. For example, preprocessor macros are composable and nestable such that one preprocessor macro may effectively be a composite of multiple other macros. Likewise for step 303, an evaluation template may effectively be a composite of multiple other templates. For example, one template may be used for a parameter of another template, and a template may have multiple parameters.

Unlike processes A and C that occur only during runtime phase 312, process B is an implementation of process A with an additional preparatory step 301 that occurs during OEM build phase 311. Afterwards during runtime phase 312, process B performs process A.

In a C++ embodiment, the reusable layer contains header files that contain parameterized definitions of relational operators in the form of template classes that interpretable execution plan 130 can instantiate with arguments that are portions of interpretable execution plan 130.

Step 301 precompiles the header files of the reusable layer, which may include precompiling the definitions of relational operators and/or precompiling some or all of evaluation template 160. For example, evaluation template 160 may be part of the reusable layer, in which case the plan compiler does not need to generate evaluation template 160 and need only instantiate evaluation template 160. Herein, template generation entails defining (in a reusable way or not) an evaluation template. Template instantiation instead entails providing arguments for the parameters of the evaluation template.

Unlike a pretokenized header (PTH) that is the result of only lexical analysis, generation of a precompiled header (PCH) further entails syntactic analysis and semantic analysis. A PCH may contain an abstract syntax tree (AST) in a binary format that compiler 152 accepts. Step 301 may optimize the AST based on semantic analysis and/or specialization for the computer architecture of DBMS 100. Example AST optimizations include inlining, constant folding, constant propagation, and dead code elimination.

No matter how the plan layer and the reusable layer are combined, and no matter which of process A-C occurs, step 305 invokes compiler 152 to generate object code that represents interpretable execution plan 130 for database statement 110 as discussed earlier herein. Partial evaluation and/or Futamura projection may occur during a combination of some of steps 301 and 303-305.

Immediately or eventually, DBMS 100 may directly execute the object code that was generated by step 305, which may entail static and/or dynamic linking of the object code into the address space of DBMS 100. The result of executing the object code is semantically the same as the result that would have been provided if interpretable execution plan 130 were interpreted instead of compiled by one of processes A-C.

In various embodiments, tools 151-152 are or are not linked to the codebase of DBMS 100 and are or are not loaded into the address space of DBMS 100. Regardless of processes A-C, an embodiment may build general purpose compiler 152 from source code of compiler 152 during OEM build phase 311. For example, limits on the size or count of an inlining may be adjusted or disabled in compiler 152, and other optimizations may be adjusted in compiler 152. Query execution is a somewhat special purpose for which universal optimization settings may be suboptimal. In an embodiment, settings switches of compiler 152 are adjusted such as by embedding compiler-specific pragmas/directives in source code of the reusable layer and/or the plan layer.

4.0 First Example Partial Evaluation

FIG. 4 is a diagram that depicts an example partial evaluation that an embodiment of DBMS 100 may perform such as during step 204 of FIG. 2. FIG. 4 is discussed with reference to FIG. 1.

Herein, a translation unit is a monolithic body of (e.g. textual) source logic that compiler 152 can accept and compile during a single invocation of compiler 152. Although a translation unit is logically monolithic, compiler 152 or a preprocessor may generate the translation unit by concatenating or otherwise combining portions of source logic from separate files, buffers, and/or streams. For example, a #include directive may cause compiler 152 or a preprocessor to logically insert the contents of one source file into the contents of another source file to generate a translation unit to be compiled as a whole.

Source code listing 410 may be all or part of a C++ translation unit that compiler 152 accepts, which does not necessarily mean that listing 410 is contained in a single source file. Listing 410 may contain a concatenation of different sequences of lines of text, that are referred to herein as snippets, such as structure 420. Listing 410 contains the following enumerated snippets 4A-4D that are shown vertically in ascending order as follows.

4A is a structure for both of template parameter 170 and compile-time constant 180.

4B is hybrid structure 420 explained below.

4C is evaluation template 160 that in this case is a template method.

4D is an inline function that implements a demonstrative relational operator.

Each of snippets 4A-4D may reside in a same or separate source file. For example, listing 410 may exist as a whole only temporarily while compiler 152 or the preprocessor operates.

Snippets 4A-4D may be part of the reusable layer discussed earlier herein that is defined (e.g. by hand) such as before or during OEM build phase 311 of FIG. 3. Snippets 4C-4D together may be the reusable specification of a relational operator, where snippet 4C is primarily a wrapper for templatizing a (e.g. legacy as explained below) relational operator (i.e. snippet 4D) that was not defined in template form. For the relational operator, all of the inputs and identifiers/references of upstream and downstream operators are provided by structure 420 whose data members are a mix of constants and variables as follows.

In structure 420, field c represents compile-time constant 180 whose format is snippet 4A. Snippet 4A has multiple fields that may aggregate constants from various sources such as properties (e.g. machine word width) of computer 100, details of database statement 110, and elements of a database schema as discussed elsewhere herein. Herein, compile-time constant 180 may be any value (of any datatype) that remains constant across repeated executions of database statement 110. Constants are amenable to partial evaluation as discussed elsewhere herein.

In structure 420, field d is a variable. Herein, a variable is data that may change between repeated executions of database statement 110. For example, values contained in a relational table are mutable according to online transaction processing (OLTP) by other database statements, even if database statement 110 does not mutate data. Variables are not amenable to partial evaluation.

In an embodiment, step 301 of FIG. 3 during OEM build phase 311 precompiles listing 410. For example, snippets 4A-4D may reside in same or separate header files. In an embodiment, the header file that contains snippet 4C includes other header file(s) to combine snippets 4A-4B and 4D. For example, snippet 4C may provide a translation unit into which snippets 4A-4B and 4D may be embedded. In any case, snippet 4C is evaluation template 160.

Precompilation may have various degrees in various embodiments. With more or less exhaustive precompilation, snippet 4D can be inlined into snippet 4C. With minimal precompilation such as pretokenization, snippets 4C-4D are tokenized without inlining that is instead deferred until partial evaluation during runtime phase 312 of FIG. 3. Depending on the embodiment, precompilation does or does not entail partial evaluation.

In an evolutionary embodiment, much or all of the reusable layer was initially developed solely to be interpreted, and query compilation with compiler 152 was later developed as an evolutionary improvement. For example, snippet 4D may be a legacy artifact that is defined in a .c or .cpp file that snippet 4C includes. That is, the .c or .cpp file may be counterintuitively treated as a header file that can be included into another header file that is a .h file.

In any case, listing 410 is a composite of snippets only from the reusable layer. Snippets 4A-4D are part of the reusable layer. None of listing 410 nor snippets 4A-4D contain any details that are specific to a particular query. It is precisely that query agnosticism that permits optional precompilation of listing 410.

For FIG. 4, runtime phase 312 of FIG. 3 may occur as follows when a live (e.g. ad hoc) query is received. Runtime phase 312 occurs in two stages for FIG. 4 that respectively generate instantiation 440 and expression 430. In a first stage that entails template instantiation, the following sequence occurs.

a) The query is parsed to generate interpretable execution plan 130.

b) Query-specific constants such as compile-time constant 180 are extracted or inferred from the query or from interpretable execution plan 130 (e.g. a Boolean that indicates the DISTINCT keyword, a count of columns projected, or a Boolean indicating whether or not a column is defined in a schema as NOT NULL). This entails initializing the fields of snippet 4A.

c) Using those query-specific constants as parameters such as template parameter 170, snippet 4C (i.e. evaluation template 160) is instantiated to generate instantiation 440. This entails initializing parameter in1 of snippet 4C as explained below.

In this example, template parameter 170 is pointer in1 shown in snippet 4C. Snippet 4C also accepts variable (i.e. non-constant) input such as pointer in2. However, pointer in2 may change each time the query is repeated. Thus, pointer in2 is not involved during template instantiation.

Template instantiation is only part of instantiation 440 that also contains additional source logic that is generated during runtime phase 312. That is, instantiation 440 is generated during runtime phase 312. Furthermore, parameters such as template parameter 170 are not the only place that constants such as all or part of compile-time constant 180 or interpretable execution plan 130 can be used. For example in instantiation 140, identifier "compute_pe_2_2" and actual arguments "2,2" are generated as ordinary (i.e. non-template) logic based on compile-time constants, even though they do not correspond to any part of template material 160 and 170.

The only part of instantiation 440 that actually instantiates a template is "compute_pe<&c_in>" that instantiates the template method of snippet 4C. In that way, the first stage generates instantiation 440 as an instantiation of snippet 4C.

In a second stage, partial evaluation occurs in any of the ways presented elsewhere herein. The second stage applies partial evaluation to instantiation 440 to generate expression 430, which may be understood according to the following Table 1 that maps components of FIG. 1 to portions of FIG. 4.

| Component of FIG. 1 | Portion of listing 410 | Portion of instantiation 440 |
| --- | --- | --- |
| evaluation template 160 | snippet 4C | "compute_pe<. . .>" |
| template parameter 170 | "in1" | |
| compile-time constant 180 | | "c_in" |

In this example when the second stage starts, snippet 4D has not yet been inlined into snippet 4 C as discussed earlier herein. Partial evaluation inlines snippet 4D into instantiation 440.

After that inlining, partial evaluation uses loop unrolling and constant folding to generate expression 430. Portions of expression 430 say "8" and "val". The "8" is computed by partial evaluation. The "val" is a variable that is not amenable to partial evaluation. For example, the actual value of val may be undetermined during partial evaluation. For example, variable in2 in snippet 4C may be uninitialized during partial evaluation. For example, a buffer that in2 will eventually point to may still be unpopulated and/or unallocated during partial evaluation.

Counterintuitively, variable val may be used to obtain a compile-time constant. In snippet 4D, "val->c.b" evaluates to b in snippet 4A that is a compile-time constant. In that way, snippet 4D is used for a prebuilt legacy interpreter and reused for queries accelerated by compilation and partial evaluation. That is significant especially because snippet 4D may be a legacy implementation of a relational operator that can, with little or no modification, be retrofitted with snippet 4C as a minimal templating wrapper. In other words, the bulk of the source codebase of the legacy interpreter is reused as is, which the state of the art does not achieve. For query compilation, the state of the art reuses little or no legacy source logic of important components of the query interpreter such as the relational operators.

5.0 Second Example Partial Evaluation

Figure 5:
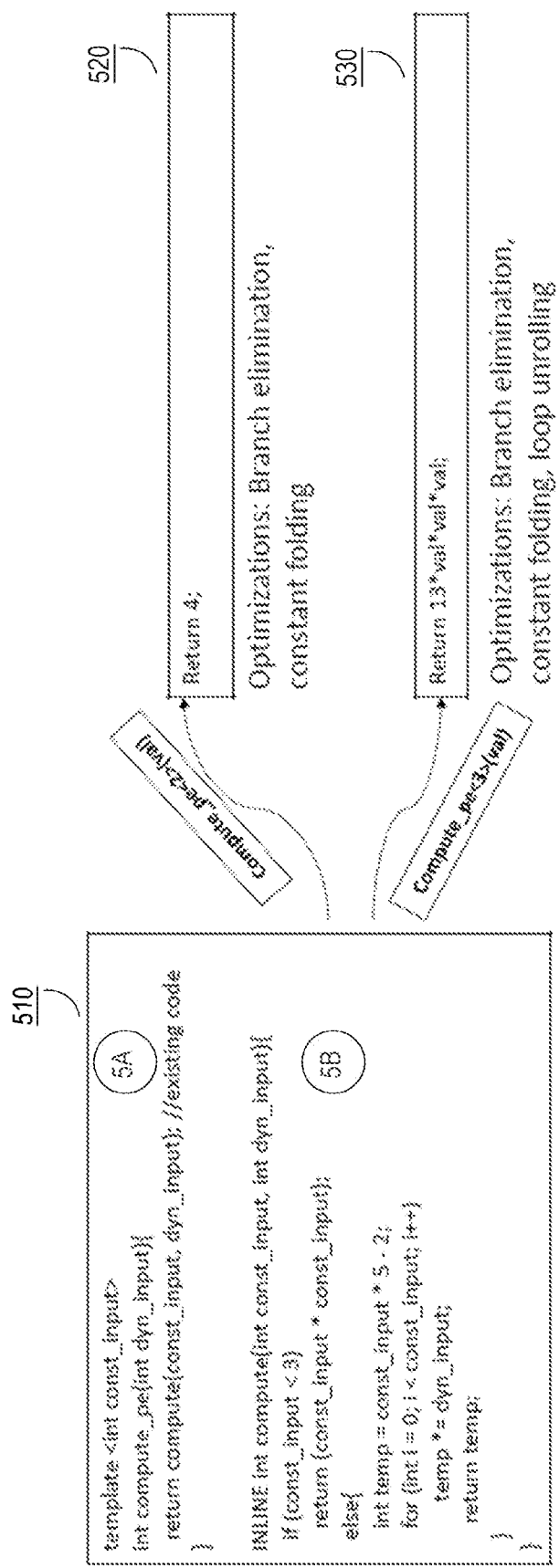
FIG. 5 is a block diagram that depicts an example partial evaluation.

FIG. 5 is a diagram that depicts an example partial evaluation that an embodiment of DBMS 100 may perform such as during step 204 of FIG. 2. FIG. 5 is discussed with reference to FIG. 1.

Source code listing 510 may be all or part of a C++ translation unit that compiler 152 accepts. Listing 510 may contain a concatenation of different sequences of lines of text, that are referred to herein as snippets. Listing 510 contains the following enumerated snippets 5A-5B that are shown vertically in ascending order as: 5A) evaluation template 160 as a template method, and 5B) an inline function.

Snippets 5A-5B may be part of the reusable layer discussed earlier herein that is defined (e.g. by hand) such as before or during OEM build phase 311 of FIG. 3. Snippet 5B may be the reusable specification of a relational operator. For the relational operator, all of the inputs and identifiers of upstream and downstream operators are provided as a mix of constants and variables.

Snippet 5B is referenced by interpretable execution plan 130. Snippet 5B contains an if-block and an else-block. Compiler 152 performs partial evaluation, including branch elimination, loop unrolling, and constant folding, to transform the if-block into expression 520 and transform the else-block into expression 530 with two and three injected as respective parameter constants as shown in the labels of both arrows. Because the if and else blocks are mutually exclusive, only one of either expression 520 or 530 is generated depending on whether the if or the else actually occurs.

6.0 Example Execution Switching Process

Figure 6:
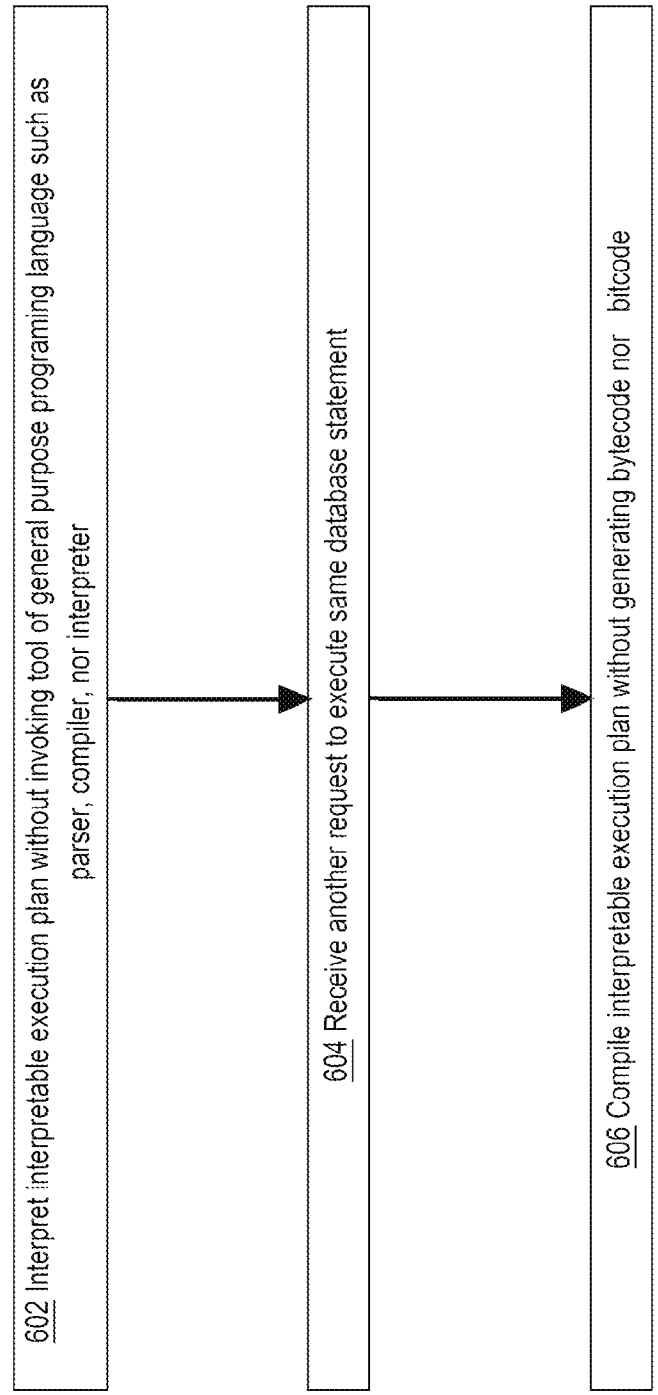
FIG. 6 is a flow diagram that depicts an example computer process that a DBMS may perform to switch from initial interpretation to eventual compilation of a same repeated database statement.

FIG. 6 is a flow diagram that depicts an example computer process that an embodiment of DBMS 100 may perform to switch from initial interpretation to eventual compilation of a same repeated database statement 110. The steps of the processes of FIGS. 2-3 and 6 are complementary and may be combined or interleaved. FIG. 6 is discussed with reference to FIG. 1.

The process of FIG. 6 occurs in response to receiving execution request 121 to execute database statement 110. Query compilation by itself is slow and may be unjustified if database statement 110 will be executed only once or only a few times. In this embodiment, DBMS 100 uses interpretation for a first one or first few requests to execute database statement 110.

Step 602 executes database statement 110 by interpreting interpretable execution plan 130 without invoking a tool of general purpose programing language 140 such as parser 151, compiler 152, nor interpreter 153. Generation of interpretable execution plan 130 may entail parsing of database statement 110 by a SQL parser, which is not parser 151.

Eventually, step 604 receives different execution request 122 to again execute same database statement 110. This time, DBMS 100 instead decides not to interpret interpretable execution plan 130. For example, costing thresholds for amortization are discussed later herein. Step 606 compiles interpretable execution plan 130 into object code and without generating bytecode nor bitcode. In other words, the object code consists essentially of hardware instructions instead of a portable intermediate representation (IR). Whether interpretable execution plan 130 itself does not contain bytecode nor bitcode depends on the embodiment.

DBMS 100 may directly execute the object code that was generated by step 604, which may entail static and/or dynamic linking of the object code into the address space of DBMS 100. The result of executing the object code is semantically the same as the result that would have been provided if interpretable execution plan 130 were interpreted instead of compiled.

In an embodiment based on techniques presented earlier herein, DBMS 100 performs in sequence and without DBMS 100 restarting:
1. executing database statement 110 by interpreting a relational operator in interpretable execution plan 130 that represents database statement 110, and
2. compiling textual source code of the relational operator.

For example, DBMS 100 is itself need not be restarted between steps 602 and 606.

In an embodiment, execution requests 121-122 provide different respective values for a same literal in database statement 110. For example, database statement 110 may be a parameterized prepared statement that DBMS 100 may cache for reuse. Preparing database statement 110 may entail generating interpretable execution plan 130. Database statement 110 may be prepared before or due to first execution request 121.

Whether prepared or not, interpretable execution plan 130 may be cached for reuse such as in a query cache. In an embodiment, database statement 110 is not a prepared statement, and interpretable execution plan 130 can be modified during reuse by replacing, in interpretable execution plan 130, the value of the literal based on which of execution requests 121-122 is executing. In various embodiments, replacement of a value of a literal does or does not entail recompiling interpretable execution plan 130, which may or may not depend on whether or not database statement 110 is a prepared statement.

7.0 Example Optimization Process Before Plan Compilation

Figure 7:
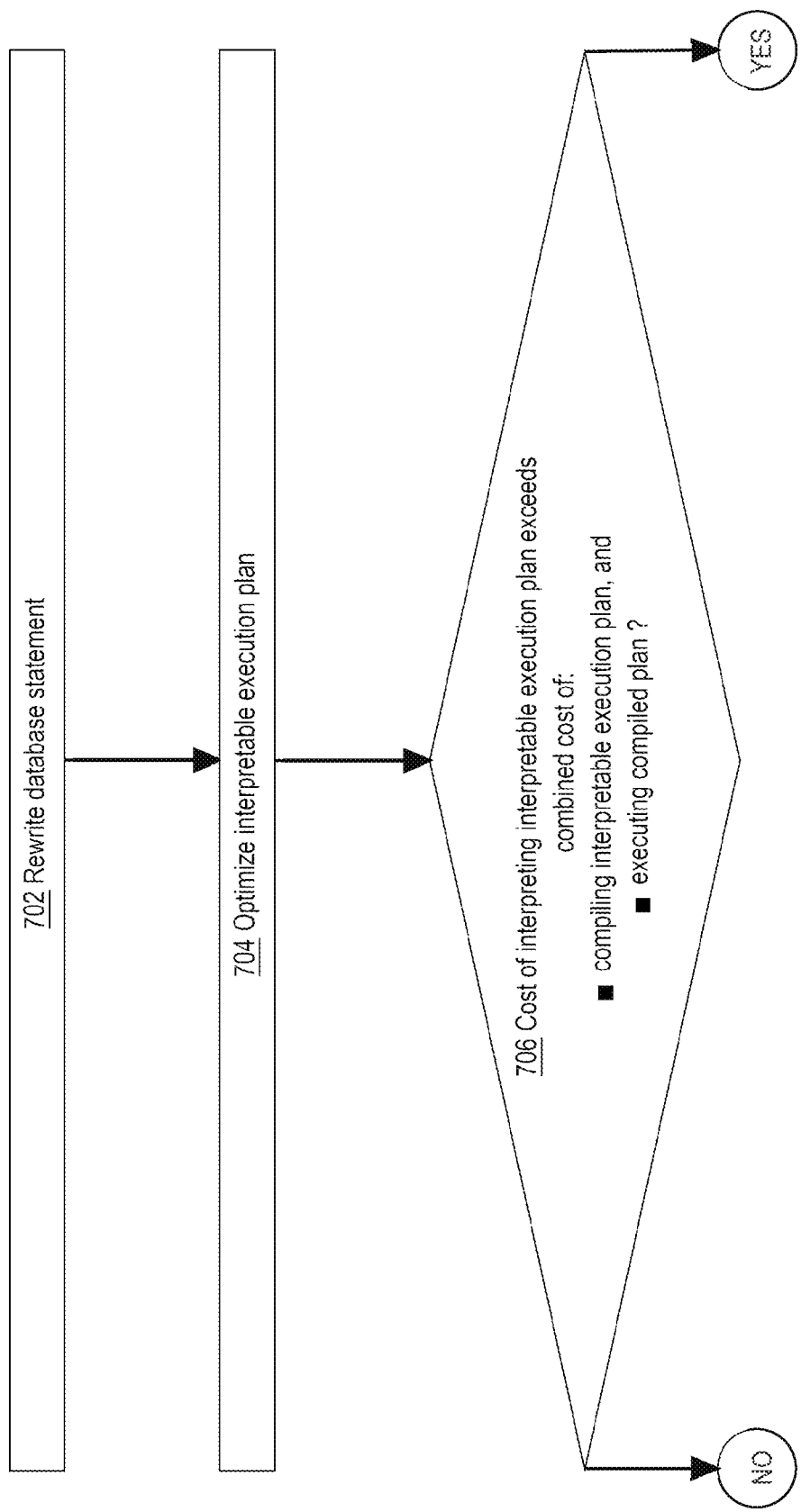
FIG. 7 is a flow diagram that depicts an example computer process that a DBMS may perform to optimize before query compilation and to defer query compilation unless a combined cost estimate satisfies a compilation threshold.

FIG. 7 is a flow diagram that depicts an example computer process that an embodiment of DBMS 100 may perform to optimize before query compilation and to defer query compilation unless a combined cost estimate satisfies a compilation threshold. The steps of the processes of FIGS. 2-3 and 6-7 are complementary and may be combined or interleaved. FIG. 7 is discussed with reference to FIG. 1.

The process of FIG. 7 occurs in response to receiving execution request 121 to execute database statement 110. Step 702 optimally rewrites database statement 110. Example SQL rewrites include using UNION ALL instead of IN, generating temporary tables, and adding hints that a query optimizer accepts. Unlike other query compilation approaches, step 702 may rewrite based on dynamic conditions and fluctuating statistics such as the cardinality of a table, the cardinality of a column, and whether or not a table or a column or previous results are already cached in volatile memory.

Step 704 optimizes interpretable execution plan 130, which may entail generating, costing, and selecting a most efficient plan. Unlike other query compilation approaches, generating and costing by step 704 may be based on dynamic conditions and fluctuating statistics such as the cardinality of a table, the cardinality of a column, and whether or not a table or a column or previous results are already cached in volatile memory.

Step 706 decides whether to compile or interpret interpretable execution plan 130 by comparing the respective costs of interpreted execution versus compiled execution. Step 706 may estimate three costs that may measure time and/or space. The three enumerated costs are: a) the cost of interpreting interpretable execution plan 130, b) the cost of compiling interpretable execution plan 130, and c) the cost of executing the compiled plan.

For example if database statement 110 will be executed only once, then query compilation is justified only if cost (a) exceeds the arithmetic sum of cost (b) plus cost (c). If database statement 110 is expected to eventually be executed N times, then costs (a) and (c) are multiplied by N, but cost (b) is not multiplied. In other words, cost (b) is the only cost that can be amortized over repeated executions, which means that query compilation provides cost containment and interpretation cannot.

Step 706 may detect whether or not plan compilation is justified based on detections related to costs (a)-(c) according to an observed or predicted statistic of execution requests 121-122 for database statement 110. A detection by step 706 may describe at least one of costs (a)-(c).

For describing any of costs (a)-(c), step 706 may predict any combination of the following estimated statistics:
- a count of repetition of requests to execute database statement 110,
- a frequency of repetition of requests to execute database statement 110, and
- a variance of a frequency of repetition of requests to execute database statement 110.

In an embodiment, step 706 may decide to simultaneously: a) interpret interpretable execution plan 130 in the foreground (i.e. critical path) of execution request 121 and b) compile interpretable execution plan 130 in the background in speculative anticipation of potential future execution requests such as execution request 122.

8.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

8.1 Query Processing

A query is an expression, command, or set of commands that, when executed, causes a server to perform one or more operations on a set of data. A query may specify source data object(s), such as table(s), column(s), view(s), or snapshot (s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
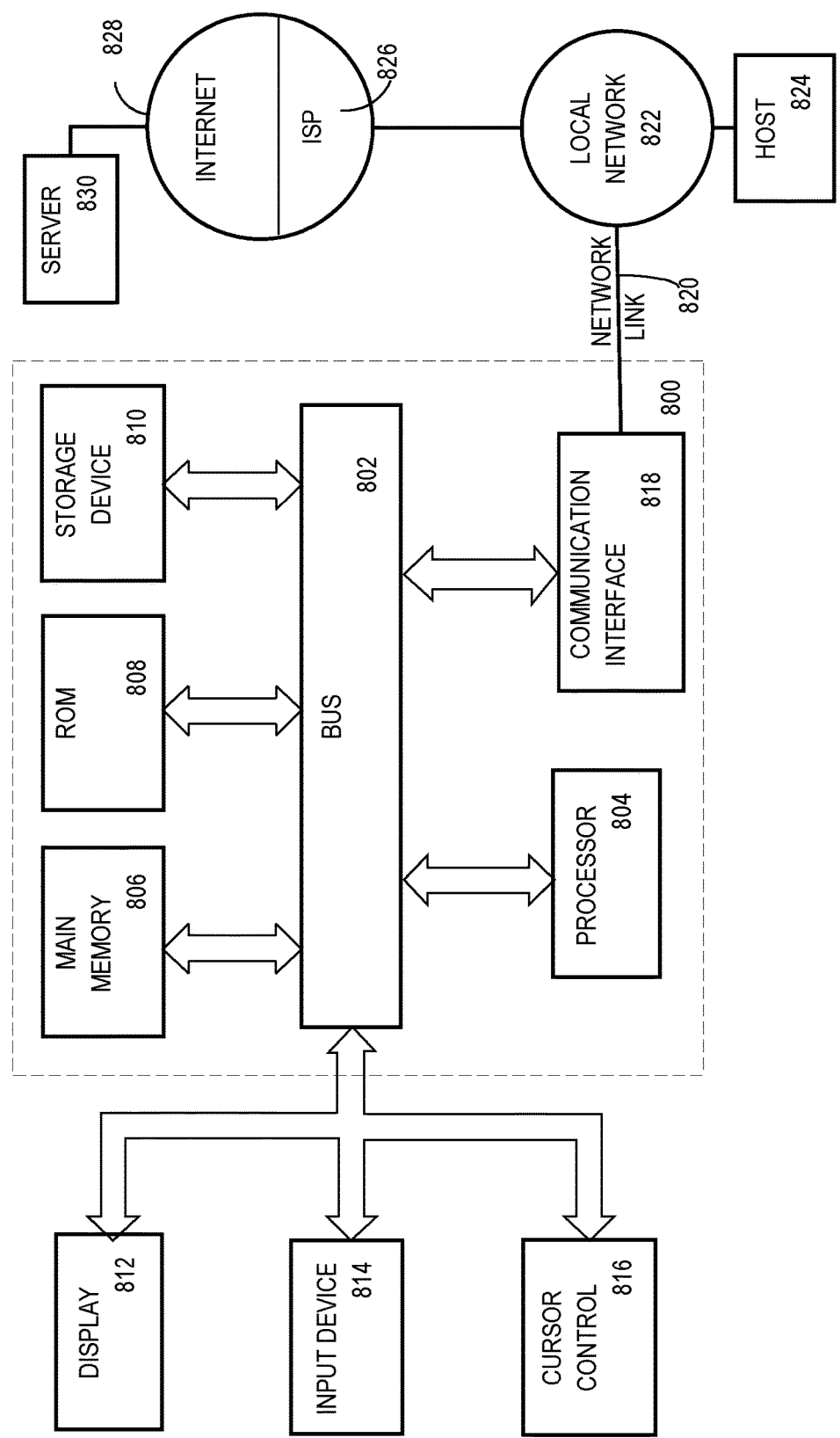
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
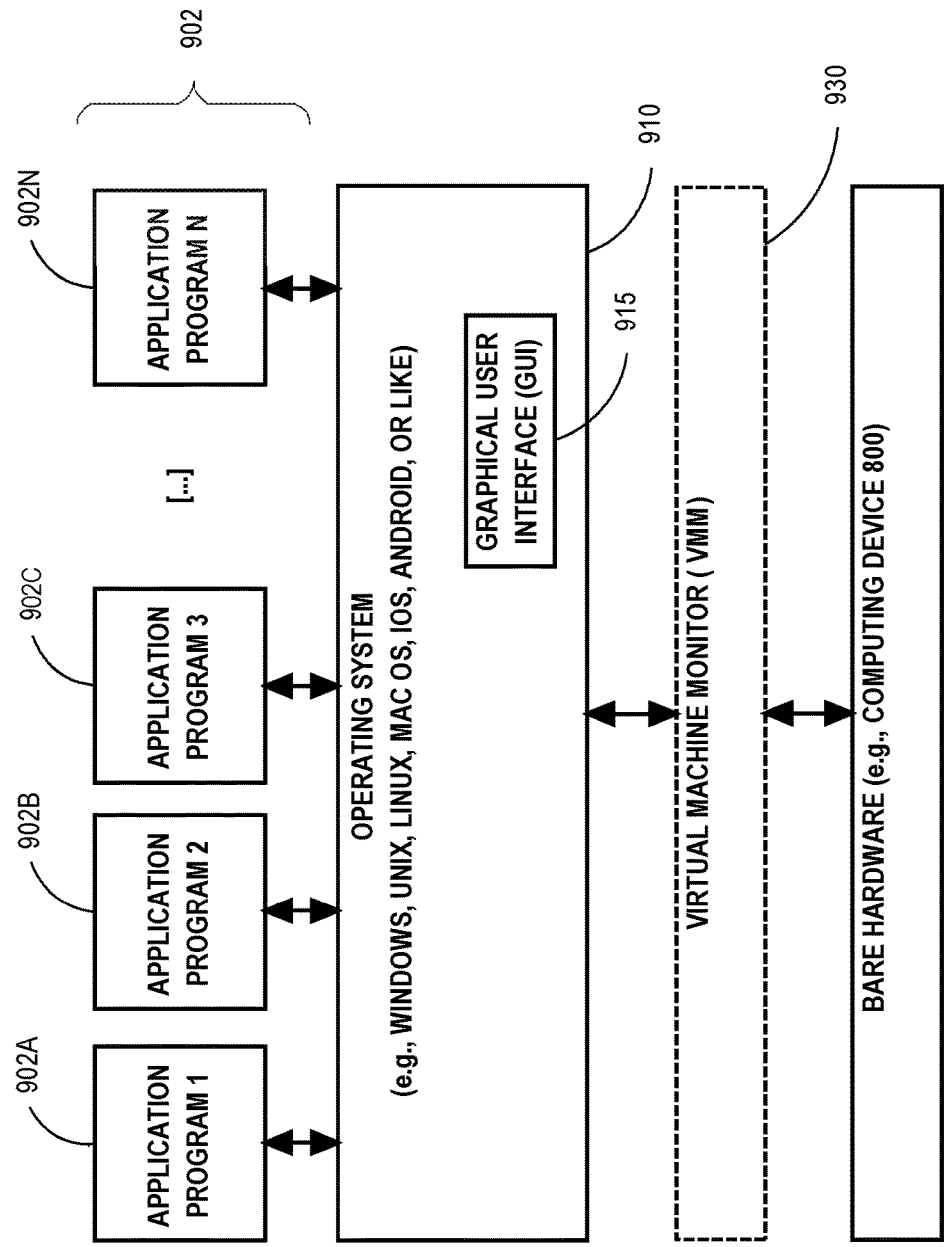
FIG. 9 is a block diagram that illustrates a basic software system that may be employed for controlling the operation of a computing system.

FIG. 9 is a block diagram of a basic software system 900 that may be employed for controlling the operation of computing system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 900 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a request to execute a database statement;
   generating, in response to the request to execute the database statement, an interpretable execution plan that represents the database statement;
   deciding, by a database management system (DBMS) that contains a plan interpreter that can interpret the interpretable execution plan, that execution of the database statement will not comprise interpreting the interpretable execution plan;
   providing the interpretable execution plan as an argument to an evaluation template that is defined in a general purpose programing language;
   generating object code by compiling, based on said providing the interpretable execution plan as the argument to the evaluation template, the interpretable execution plan; and
   executing, based on said compiling the interpretable execution plan, the database statement.

2. The method of claim 1 wherein said compiling comprises partial evaluation of the interpretable execution plan as a compile-time constant.

3. The method of claim 2 wherein the general purpose programming language is a high level language.

4. The method of claim 1 further comprising precompiling part of the evaluation template before said receiving the request to execute the database statement.

5. The method of claim 1 wherein said compiling comprises partial evaluation based on at least one selected from a group consisting of:
   a plurality of noncontiguous memory allocations,
   a tree,
   a directed acyclic graph (DAG),
   a compound expression that is based on the database statement, and
   database schema information.

6. The method of claim 1 wherein the compiling comprises partial evaluation based on at least one selected from a group consisting of: a database dictionary, an identifier of a database table, a statistic of a database table, column metadata, an identifier of a database trigger, a security label, and an identifier of an index.

7. The method of claim 1 wherein said compiling comprises partial evaluation based on at least one selected from a group consisting of: a column identifier, a database datatype, a column constraint, a column statistic, and encryption metadata.

8. The method of claim 1 wherein said compiling comprises partial evaluation based on a security label that is assigned to one selected from a group consisting of: a user, a table, and a table row.

9. The method of claim 3 wherein:
said compiling the interpretable execution plan comprises invoking a compiler of the high level language;
said partial evaluation of the interpretable execution plan as said compile-time constant comprises invoking a general purpose text macro preprocessor that is not built into the compiler nor the high level language.

10. The method of claim 1 wherein:
the request to execute the database statement is a first request to first execute the database statement;
the method further comprises:
the plan interpreter interpreting the interpretable execution plan to generate a response to the first request, and
receiving, after said plan interpreter interpreting the interpretable execution plan, a second request to second execute the database statement; and
deciding that second execution of the database statement will not comprise interpreting the interpretable execution plan is in response to receiving the second request to second execute the database statement.

11. The method of claim 10 wherein:
said plan interpreter interpreting the interpretable execution plan does not invoke a tool of a general purpose programing language;
said tool of the general purpose programing language comprises at least one selected from a group consisting of: a parser, a compiler, and an interpreter.

12. The method of claim 10 wherein:
the first request specifies a first value for a literal in the database statement;
the second request specifies a second value for the literal in the database statement.

13. The method of claim 1 further comprising detecting that a cost of said interpreting the interpretable execution plan exceeds a combined cost of: said compiling the interpretable execution plan and said executing, based on said compiling the interpretable execution plan, the database statement.

14. The method of claim 13 wherein:
a detection is based on an estimated statistic of said request to execute the database statement;
the estimated statistic of said request to execute the database statement comprises at least one selected from a group consisting of:
a count of repetition of said request to execute the database statement,
a frequency of repetition of said request to execute the database statement, and
a variance of a frequency of repetition of said request to execute the database statement;
the detection describes at least one selected from a group consisting of:
a cost of said compiling the interpretable execution plan, and
a cost of said executing, based on said compiling the interpretable execution plan, the database statement.

15. The method of claim 1 further comprising rewriting the database statement before said generating the interpretable execution plan.

16. The method of claim 1 wherein said compiling the interpretable execution plan does not comprise generating bytecode nor bitcode.

17. One or more non-transitory computer-readable media storing instructions that, when executed by one or more processors, cause:
receiving a request to execute a database statement;
generating, in response to the request to execute the database statement, an interpretable execution plan that represents the database statement;
deciding, by a database management system (DBMS) that contains a plan interpreter that can interpret the interpretable execution plan, that execution of the database statement will not comprise interpreting the interpretable execution plan;
providing the interpretable execution plan as an argument to an evaluation template that is defined in a general purpose programing language;
generating object code by compiling, based on said providing the interpretable execution plan as the argument to the evaluation template, the interpretable execution plan; and
executing, based on said compiling the interpretable execution plan, the database statement.

18. The one or more non-transitory computer-readable media of claim 17 wherein said compiling comprises partial evaluation of the interpretable execution plan as a compile-time constant.

19. The one or more non-transitory computer-readable media of claim 17 wherein said compiling comprises partial evaluation based on at least one selected from a group consisting of:
a plurality of noncontiguous memory allocations,
a tree,
a directed acyclic graph (DAG),
a compound expression that is based on the database statement, and
database schema information.

20. The one or more non-transitory computer-readable media of claim 17 wherein the compiling comprises partial evaluation based on at least one selected from a group consisting of: a database dictionary, an identifier of a database table, a statistic of a database table, column metadata, an identifier of a database trigger, a security label, and an identifier of an index.

21. The one or more non-transitory computer-readable media of claim 17 wherein:
the request to execute the database statement is a first request to first execute the database statement;
the instructions further cause:
the plan interpreter interpreting the interpretable execution plan to generate a response to the first request, and
receiving, after said plan interpreter interpreting the interpretable execution plan, a second request to second execute the database statement; and
deciding that second execution of the database statement will not comprise interpreting the interpretable execution plan is in response to receiving the second request to second execute the database statement.

22. The one or more non-transitory computer-readable media of claim 18 wherein the general purpose programing language is a high level language.

23. The one or more non-transitory computer-readable media of claim 17 wherein the instructions further cause precompiling part of the evaluation template before said receiving the request to execute the database statement.

24. The one or more non-transitory computer-readable media of claim 17 wherein the instructions further cause detecting that a cost of said interpreting the interpretable execution plan exceeds a combined cost of: said compiling the interpretable execution plan and said executing, based on said compiling the interpretable execution plan, the database statement.

* * * * *

UNITED STATES PATENT AND TRADEMARK OFFICE
CERTIFICATE OF CORRECTION

| | | |
|---|---|---|
| PATENT NO. | : 12,099,508 B2 | Page 1 of 1 |
| APPLICATION NO. | : 17/948821 | |
| DATED | : September 24, 2024 | |
| INVENTOR(S) | : Aghababaie Beni et al. | |

It is certified that error appears in the above-identified patent and that said Letters Patent is hereby corrected as shown below:

On the Title Page

Page 2, Column 2, item [56], under other publications, Line 29, delete "Transations" and insert -- Transactions --, therefor.

In the Specification

In Column 7, Line 22, delete "Evalutation" and insert -- Evaluation --, therefor.

In Column 11, Line 62, delete "30 A-B" and insert -- 302 A-B --, therefor.

In Column 12, Line 9, delete "302" and insert -- 302 B --, therefor.

Signed and Sealed this
Twenty-eighth Day of January, 2025

Coke Morgan Stewart
*Acting Director of the United States Patent and Trademark Office*